(12) United States Patent
Chung

(10) Patent No.: US 12,296,206 B2
(45) Date of Patent: May 13, 2025

(54) FIRE SUPPRESSION SYSTEM AND FIREFIGHTING AIRCRAFT HAVING THE SAME

(71) Applicant: Yongju Chung, Clovis, CA (US)

(72) Inventor: Yongju Chung, Clovis, CA (US)

(73) Assignee: Yongju Chung, Clovis, CA (US)

( * ) Notice: Subject to any disclaimer, the term of this patent is extended or adjusted under 35 U.S.C. 154(b) by 0 days.

(21) Appl. No.: 17/979,193

(22) Filed: Nov. 2, 2022

(65) Prior Publication Data

US 2023/0347192 A1    Nov. 2, 2023

Related U.S. Application Data

(60) Provisional application No. 63/337,507, filed on May 2, 2022.

(30) Foreign Application Priority Data

Sep. 14, 2022   (KR) .......................... 10-2022-0115898

(51) Int. Cl.
   *A62C 3/02*    (2006.01)
   *B64D 1/18*    (2006.01)

(52) U.S. Cl.
   CPC .............. *A62C 3/02* (2013.01); *A62C 3/0242* (2013.01); *B64D 1/18* (2013.01)

(58) Field of Classification Search
   CPC .......... A62C 3/02; A62C 3/0242; B64D 1/18; B64D 1/16
   USPC .............................. 169/53; 244/136; 239/171
   See application file for complete search history.

(56) References Cited

U.S. PATENT DOCUMENTS

| | | | |
|---|---|---|---|
| 3,442,334 A | | 5/1969 | Gousetis |
| 3,770,060 A | * | 11/1973 | Forsyth ................... A62C 27/00 169/24 |
| 4,090,567 A | * | 5/1978 | Tomlinson ............... B64D 1/16 169/53 |
| 5,804,716 A | * | 9/1998 | McGuire ................ A62C 37/50 73/198 |
| 6,464,094 B2 | * | 10/2002 | Zacharias ............ A62C 3/0292 220/4.12 |
| 11,084,412 B1 | * | 8/2021 | Shultz ..................... H02S 10/10 |

(Continued)

FOREIGN PATENT DOCUMENTS

| | | | | |
|---|---|---|---|---|
| CN | 107494492 A | * | 12/2017 | ............. A01M 5/00 |
| FR | 2665875 A1 | * | 2/1992 | ............ B64D 47/00 |

(Continued)

OTHER PUBLICATIONS

Office Action issued by the KIPO on Jun. 20, 2023 with respect to the Korean Patent Application No. 10-2022-0115898.
Notice of Allowance for Korean Patent Application No. 10-2022-0115898 issued by the Korean Patent Office on Oct. 16, 2023.

(Continued)

*Primary Examiner* — Chee-Chong Lee
*Assistant Examiner* — Kevin Edward Schwartz
(74) *Attorney, Agent, or Firm* — IP & T GROUP LLP

(57) ABSTRACT

A fire suppression system and a firefighting aircraft having a fire extinguishing agent container mounted in a cargo hold of an aircraft for storing the fire extinguishing agent, a pump connected to the fire extinguishing agent container by a first fire hose and configured to pump the fire extinguishing agent, and a launch device for suppressing the fire by launching the fire extinguishing agent pumped from the pump.

17 Claims, 8 Drawing Sheets

(56) References Cited

U.S. PATENT DOCUMENTS

| | | | |
|---|---|---|---|
| 2006/0207774 A1 | 9/2006 | Payassis | |
| 2008/0035648 A1* | 2/2008 | Nolan | B64D 1/16 |
| | | | 220/562 |
| 2008/0110326 A1* | 5/2008 | Sbrighi | B63G 1/00 |
| | | | 89/41.01 |
| 2013/0186653 A1* | 7/2013 | Cerrano | G08B 5/38 |
| | | | 169/46 |
| 2013/0199806 A1* | 8/2013 | Zimmerman | A62C 31/12 |
| | | | 169/53 |
| 2013/0312985 A1* | 11/2013 | Collins | A62C 3/02 |
| | | | 29/401.1 |
| 2016/0236023 A1* | 8/2016 | Zimmerman | A62C 31/12 |
| 2017/0252583 A1* | 9/2017 | Goeltz | B66F 11/044 |
| 2018/0043194 A1* | 2/2018 | Zimmerman | A62C 3/0242 |
| 2022/0134152 A1* | 5/2022 | Seligson | A62C 3/00 |
| | | | 169/53 |

FOREIGN PATENT DOCUMENTS

| | | |
|---|---|---|
| JP | 2007-501725 A | 2/2007 |
| JP | 2011-212225 A | 10/2011 |
| KR | 20-0313882 Y1 | 5/2003 |
| KR | 10-2004-0033650 A | 4/2004 |
| KR | 200357385 Y1 | 7/2004 |
| KR | 10-2005-0073645 A | 7/2005 |
| KR | 20-0457773 Y1 | 1/2012 |
| KR | 10-2013-0063242 A | 6/2013 |
| KR | 10-2017-0121183 A | 11/2017 |
| KR | 10-1873856 B1 | 7/2018 |
| KR | 10-1926699 B1 | 12/2018 |
| KR | 10-2003500 B1 | 7/2019 |
| KR | 10-2127606 B1 | 6/2020 |
| KR | 10-2020-0092275 A | 8/2020 |
| KR | 10-2021-0057474 A | 5/2021 |
| KR | 10-2022-0048163 A | 4/2022 |

* cited by examiner

FIRE SUPPRESSION SYSTEM AND FIREFIGHTING AIRCRAFT HAVING THE SAME

CROSS-REFERENCE TO RELATED APPLICATION

The present application claims priority under 35 U.S.C. § 119(a) to U.S. Provisional Application No. 63/337,507, filed on May 2, 2022 and Korean patent application number 10-2022-0115898, filed on Sep. 14, 2022, in the Korean Intellectual Property Office, the entire disclosure of which is incorporated herein by reference.

BACKGROUND

1. Field of Invention

The present disclosure relates to a fire suppression system and a firefighting aircraft having the same.

2. Description of Related Art

Recently, large-scale wildfires continue to occur around the world, and it is increasingly likely that such wildfires will continue to occur in the future due to the increasing influence of global warming.

As with any type of fires, early suppression of wildfires is very crucial. When an early suppression time is missed out, it may escalate into a larger-scale wildfire spreading to many mountains and forests, causing immediate ecological, economic, and social losses as well as deaths of firefighters and civilians. In the long run, it takes about 40 to 100 years to restore burned mountains and forests back to their original state, which would require continuous efforts and costs. The bigger issue, however, is that these large-scale wildfires have become more frequent in recent years, for example, almost more than once every year, and it is likely that they will occur more often in the future.

In order to extinguish such wildfires, firefighters and fire trucks as well as firefighting helicopters and aircraft, and even civilians are mobilized to extinguish wildfires in most countries. Unfortunately, the reality is that wildfires often escalate into larger-scale wildfires, making such firefighting efforts seem insignificant. In other words, in a certain large-scale wildfire, many fire trucks, firefighters, helicopters, and civilians may participate in extinguishing the wildfire, but the reality is that these efforts are not sufficient for extinguishing the wildfire. The difficulty in extinguishing wildfires is due to problems with the fire extinguishing methods currently in use.

Nowadays, one of the main firefighting equipments used in extinguishing wildfires includes a firefighting helicopter or a firefighting aircraft. However, they have three major shortcomings. Firstly, there are geographical constraints. In the case of a firefighting aircraft, it is necessary to travel to and from an aircraft landing site, and even in the case of a firefighting helicopter, the distance from a water source (e.g., a river or a lake) to the scene of the fire is an important factor for determining effectiveness of wildfire extinguishing. Here, it may be fortunate to have a water source nearby, but if there is not a nearby water source, that is, if the water source is at a remote location, a lot of time may be consumed by simply traveling back and forth. Furthermore, even during a golden time for firefighting upon receiving an initial report of a wildfire, when a water source is distant, firefighters may be required to stop by the distant water source, and then go to the scene of the fire. Secondly, the fire extinguishing method is inefficient per se. The extinguishing method of the related art is inefficient as the method seeks to simply pour water over fires without monitoring the fire condition and aiming fire hoses to spray water as opposed to the case of firefighters extinguishing fires on the ground in general. According to the method of the related art, embers may be left easily on tree branches or somewhere else, and the method of the related art is also inefficient in terms of utilizing water and helicopter fuel resources as helicopters may have to move back to a water source again for the remaining embers. Thirdly, there is a risk involved in low altitude flying. Firefighting helicopters are exposed to the risk of low altitude flying just above the water's surface each time to obtain water from the water source. Due to the nature of helicopters, flying at a low altitude is very dangerous.

In response to an increasing number of wildfires due to climate change, various countries including the United States and Republic of Korea have established their own separate research departments for research and development of wildfire extinguishing equipments. However, for some unknown reason, the same fire extinguishing methods have been used for more than 50 years thus far. For example, in the case of firefighting helicopters, there has not been any significant development other than improvements in helicopters' performance for picking up more water than those in the past. Such problem may lead to a self-intensifying vicious cycle, resulting in an increased frequency of wildfires by further fueling global warming as the earth's ability to purify carbon dioxide decreases in response to forest areas burned by wildfires in various countries around the world. Therefore, there is an imperative and urgent need for technology development that overcomes the aforementioned three shortcomings.

SUMMARY

The present disclosure has been made in an effort to solve the three shortcomings of the related art as described above, and the present disclosure has also been made in an effort to extinguish wildfires in a more efficient way than the wildfire extinguishing methods of the related art even when wildfires escalate into a larger scale due to a failure to achieve early suppression resulting from reasons such as strong winds. Here, early suppression refers to complete suppression of the wildfire within 2 hours or up to 3 hours by aircraft, assuming that a report on the wildfire is made almost at the same time as the occurrence of the wildfire.

Therefore, in order to overcome the practical difficulties as described above in the present disclosure, it may be necessary to resolve the following issues. Firstly, in order to overcome the shortcoming of geographical constraints, the firefighting authorities should be able to determine a suitable location as a water supply point for providing water by itself. That way, a systematic and efficient plan for wildfire extinguishing may be organized regardless of the location of a river or a lake. Secondly, there is a need for more advanced technology in order to overcome the inefficiency of simply pouring water over fires. In other words, there is a need for an efficient fire extinguishing method comparable to a firefighter on the ground who may use a hose from a firefighting vehicle to put out a fire while looking at the condition of the fire. Thirdly, in order to reduce the risk of firefighting helicopters, it is necessary to first eliminate the risk of flying at a low altitude just above the water surface and to reduce the number of possible flights.

In accordance with an aspect of the present disclosure, there is provided a fire suppression system, wherein the fire suppression system is installed in a cargo hold of an aircraft to suppress a fire, the fire suppression system may include: a fire extinguishing agent container mounted in the cargo hold for storing a fire extinguishing agent; a pump connected to the fire extinguishing agent container by a first fire hose for pumping the fire extinguishing agent; and a launch device for suppressing a fire by launching the fire extinguishing agent pumped from the pump, wherein the launch device includes: a launch tube with a nozzle connected to the pump by a second fire hose for injecting or spraying the fire extinguishing agent pumped from the pump; a support portion installed in the cargo hold; a rotating portion installed between the support portion and the launch tube for allowing the launch tube to rotate up, down, left, and right; a handle portion installed to surround the launch tube and configured to steer a direction of the nozzle of the launch tube up, down, left, and right; and a control portion interfaced with a display for displaying multiple function buttons and indicating a current status, and interfaced with multiple sensors for detecting steering of the handle portion and a remaining amount of the fire extinguishing agent stored in the fire extinguishing agent container.

Specifically, the rotating portion may include: a rotating gear box fixedly installed on an upper portion of the support portion; and a rotating member installed between the rotating gearbox and the launch tube, the rotating member being rotatable forward, backward, left, and right according to steering of the handle portion.

Specifically, the control portion may be configured to control the pump by selecting whether or not to operate the pump (on or off) on the display, control the rotating portion by selecting a rotation function (a manual function or a semi-automatic function) for rotating the rotating portion forward, backward, left, and right on the display, control the nozzle by selecting a launching method (an injection method or a spraying method) for the fire extinguishing agent injected through the nozzle on the display, and control the nozzle by selecting a launching pressure (high pressure, medium pressure, or low pressure) for injecting the fire extinguishing agent through the nozzle on the display.

Specifically, when the forward, backward, left, and right rotation function of the rotating portion is selected as the manual function on the display, the control portion may be configured to control the operation of the rotating gearbox to be in an off-state such that the rotating member rotates freely according to steering of the handle portion.

Specifically, when the forward, backward, left, right rotation function of the rotating portion is selected as the semi-automatic function on the display, the control portion may be configured to control the operation of the rotating gearbox to be in an on-state such that the rotating member is forcibly rotated or forcibly fixed according to steering of the handle portion.

Specifically, the control portion may be configured to: when steering is detected by a sensor for detecting steering of the handle portion, control the rotation of the rotating gearbox to be performed such that the nozzle of the launch tube moves in any one of up, down, left, and right directions as the rotating member forcibly rotates in any one of forward, backward, left, and right directions in response to a steering direction of the handle portion; and when no steering is detected by the sensor for detecting the steering of the handle portion, control the rotation of the rotating gearbox to be stopped such that the launch tube maintains the direction of the nozzle as the rotating member is forcibly fixed in the absence of steering of the handle portion.

Specifically, the control portion may be configured to control the display to display, in real time, a residual amount measured at the sensor for detecting the residual amount of the fire extinguishing agent stored in the fire extinguishing agent container, and generate an alarm when the measured residual amount reaches a preset value.

Specifically, the support portion may be installed on a guide rail provided in the cargo hold, may be slidable back and forth along the guide rail for positioning, and may be fixed by a stopper provided on the guide rail when suppressing the fire.

Specifically, the fire extinguishing agent container may include: a main body for storing the fire extinguishing agent; an inlet provided on an upper surface of the main body for storing the fire extinguishing agent inside the main body; an outlet coupled to the first fire hose and provided on a side surface of the main body for supplying the fire extinguishing agent stored in the main body to the launch device; and a plurality of wheels $1o$ provided on a lower surface of the main body for loading onto the cargo hold of the aircraft at the ground.

Specifically, the fire extinguishing agent container may be loaded onto the aircraft from the land by a loading device provided in the cargo hold, and may be detachably mounted to the container fixing device provided in the cargo hold.

Specifically, the fire extinguishing agent container may further include a sloshing suppression device installed inside the main body for preventing interference with movement of the aircraft due to sloshing of the fire extinguishing agent stored in the main body.

Specifically, the sloshing suppression device may be any one of at least a perforated plate installed at a predetermined height upward from a lower surface of the main body and a plurality of baffles installed at a predetermined height inward from an inner surface of the main body, or may be formed from a combination thereof.

Specifically, the sloshing suppression device may include: a buoyancy plate covering an upper surface of the fire extinguishing agent and having a plurality of flow holes; a plurality of guide members installed in a vertical direction on a side surface of the main body and arranged at a predetermined interval in a horizontal direction; and a plurality of sliding members having one end connected to each of the plurality of guide members to be capable of rising and falling according to an upper surface level of the fire extinguishing agent, and the other end fixedly connected to an edge of the buoyancy plate.

Specifically, the pump may be a combined water supply and drainage pump installed in a part of the cargo hold or the fire extinguishing agent container of the aircraft, and when suppressing a fire, the pump is configured to operate as a drainage pump, and to cause the fire extinguishing agent to be launched from the nozzle through the first fire hose connected to the outlet of the fire extinguishing agent container and the second fire hose connected to the launch tube of the launch device, and when replenishing a new fire extinguishing agent during flight with the fire extinguishing agent container mounted in the cargo hold, the pump is configured to operate as a water supply pump, and to separate the first fire hose from the outlet and connect the first fire hose to the inlet of the fire extinguishing agent container and separate the second fire hose from the launch tube and connect the second fire hose to a third fire hose to replenish the new fire extinguishing agent.

Specifically, the third fire hose may include one end connected to the second fire hose so as to have a length extending to a water source on the ground, and at the other end, an inlet pipe into which a new extinguishing agent is introduced into an upper end of one side of the main body to prevent an inflow of foreign substances.

In accordance with other aspect of the present disclosure, there is provided a firefighting aircraft, including: the fire suppression system according to claim 1; and the aircraft on which the fire suppression system is installed, wherein the aircraft may include: a cockpit; a cargo hold separated by a bulkhead, wherein a fire extinguishing agent container is mounted in the cargo hold; a loading ramp provided at a rear side of the cargo hold and configured to load or unload the fire extinguishing agent container to and from the ground; and an entrance provided on a side surface of the cargo hold and at which the launch device is located.

Specifically, the aircraft may further include a loading device installed on the bulkhead side of the cargo hold for loading the fire extinguishing agent container from the ground to the cargo hold, wherein the loading device may be a winder configured to connect the fire extinguishing agent container with a wire to pull the fire extinguishing container into the cargo hold.

Specifically, the aircraft may further include: a container fixing device provided at a bottom of the cargo hold for fixing the fire extinguishing agent container, wherein the container fixing device may include: a front fastening portion installed to correspond to a front width of the fire extinguishing agent container and fixedly installed on the bottom of the cargo hold to fix a front side of the fire extinguishing agent container; a rear fastening portion installed to correspond to a rear width of the fire extinguishing agent container and variably installed on the bottom of the cargo hold to avoid interference when loading the fire extinguishing agent container into the cargo hold to fix a rear side of the fire extinguishing agent container; and a wheel fastening portion installed to correspond to a plurality of wheels provided at a lower surface of a main body of the fire extinguishing agent container, and variably installed on the bottom of the cargo hold to avoid interference when loading the fire extinguishing agent container onto the cargo hold to fix the plurality of wheels.

Specifically, the aircraft may further include a wheel guide portion extending from the loading ramp toward the bulkhead to guide a plurality of wheels provided on a lower surface of a main body of the fire extinguishing agent container when the fire extinguishing agent container is loaded into the cargo hold.

Specifically, the aircraft may further include a guide rail installed to extend a predetermined length from the entrance to the inside of the cargo hold to adjust the position of the launch device by sliding the launch device back and forth, wherein the guide rail is provided with a stopper for fixing the launch device after adjusting the position of the launch device.

The fire suppression system and the firefighting aircraft having the same according to example embodiments of the present disclosure may overcome the three shortcomings of the wildfire extinguishing method of the related art as described above.

Firstly, there are geographical constraints. The fire suppression system and the firefighting aircraft having the same according to the present disclosure may overcome the geographical constraints of the existing extinguishing methods of the related art. In other words, the firefighting aircraft of the present disclosure may provide a fire extinguishing agent container that is capable of being mounted and replaced inside the aircraft such that the fire extinguishing agent container filled with the fire extinguishing agent may be directly loaded and moved to the scene of the wildfire upon an initial report on the wildfire regardless of the location of the water source. It works under the same principle as a fire vehicle on the ground brings water directly to the scene of the fire upon a report on the fire. This corresponds to the way that the firefighting authorities respond regardless of the water source at the initial report on a wildfire, but the firefighting authorities may organize a firefighting plan regardless of the water source for an entire wildfire-prone area. For example, it is assumed that there is a huge wildfire-prone area. Then, there should be several cities or towns around or within the wildfire-prone area. Assuming that the firefighting aircraft of this embodiment also uses tap water as a fire extinguishing agent similar to a fire vehicle on the ground, these cities or towns where tap water is available may become eligible areas for fire extinguishing agent (water) supply sites. Among these eligible areas, several locations are appropriately selected for deploying the firefighting aircrafts of this embodiment. In this case, if the area to be covered is unavoidably wide for deployment, multiple firefighting aircrafts of this embodiment are deployed correspondingly to satisfy the need, and if the area to be covered is relatively small, a smaller number of firefighting aircrafts are deployed. Of course, in this selected area, a landing site for firefighting aircraft of this embodiment is provided, and also provided is a pump facility for filling an empty fire extinguishing agent container, that is, a large faucet. In order to prepare for a major wildfire, it is desirable to build several of these pump facilities. This is to fill multiple empty fire extinguishing agent containers at the same time. Additionally, it is desirable to have extra fire extinguishing agent containers available. This is also for the same reason. As such, upon receipt of a wildfire report, the firefighting aircrafts of this embodiment of the selected fire extinguishing agent supply site closest to the wildfire scene may embark on extinguishing the wildfire. Furthermore, while extinguishing the fire, other more remote firefighting aircrafts of this embodiment may arrive and assist with extinguishing the fire. As such, it is likely to be sufficient to extinguish the fire in view of the speed of the firefighting aircraft of this embodiment. However, for example, if the firefighting aircraft of this embodiment which arrived initially failed to extinguish the wildfire after taking off for the first time and had to additionally extinguish the fire, these aircrafts may be required to return to the fire extinguishing agent supply site and quickly replace their fire extinguishing agent containers filled with the fire extinguishing agents and head back to the wildfire area. Also, at the fire extinguishing agent supply site, empty fire extinguishing agent containers are filled up at the same time using multiple water supply facilities (pump facilities). Thus, if the firefighting aircrafts of this embodiment having arrived at the scene of the wildfire more than once and worked to extinguish the wildfire were not able to completely extinguish the wildfire, the firefighting aircrafts may move to this nearby area and have their extinguishing agent containers replaced. Of course, if there is not enough time for the fire extinguishing agent supply facilities (pump facilities, etc.) of the fire extinguishing agent supply site closest to the scene of the wildfire to fill empty fire extinguishing agent containers of the returning firefighting aircrafts of this embodiment, the same operations may be repeated at the second closest fire extinguishing agent site to the scene of the wildfire. This may be easily done by wireless communication between pilots and between fire extinguishing agent suppliers.

Secondly, the fire extinguishing method has the shortcoming of inefficiency. The fire suppression system and the firefighting aircraft having the same according to the present disclosure may overcome the inefficiency of the existing fire extinguishing method of the related art. In other words, the firefighting aircraft of the present disclosure is equipped with a fire suppression system including a fire extinguisher container, a pump, and a fire hose for extinguishing a fire in a similar manner to firefighters who extinguish fires on the ground. Furthermore, firefighters are also on board the firefighting aircraft when extinguishing a fire. Firefighters may monitor the spread of the wildfire through helicopter windows directly from the air above the scene of the wildfire, and may inject or spray fire extinguishing agents such as water intensively on necessary spots only. This extinguishing method is far more effective than the existing method. The reason is because the method of the present disclosure is no different from the manner firefighters on the ground spray water on necessary spots only. Furthermore, thanks to such effectiveness, the amount of wastes from the fire extinguishing agent (water) may be significantly reduced.

Thirdly, there is a shortcoming of low altitude flying risks. The fire suppression system and the firefighting aircraft having the same according to the present disclosure may reduce the risk of low altitude 1o flying of the fire extinguishing method of the related art. In contrast to the method of the related art, the firefighting aircraft of the present disclosure may allow pilots to focus only on navigating the aircraft without having to directly float water from a water source or spray water on fires. In other words, pilots may focus on the navigating operation as firefighters onboard the same aircraft are in charge of extinguishing fires, thereby reducing flight accidents significantly. Moreover, since the extinguishing method of the present disclosure is far more efficient than the existing method of the related art, not only the amount of waste water may be reduced, but also the number of flights may be decreased accordingly, and above all, the risk of low altitude flying just above the water surface may also be avoided.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
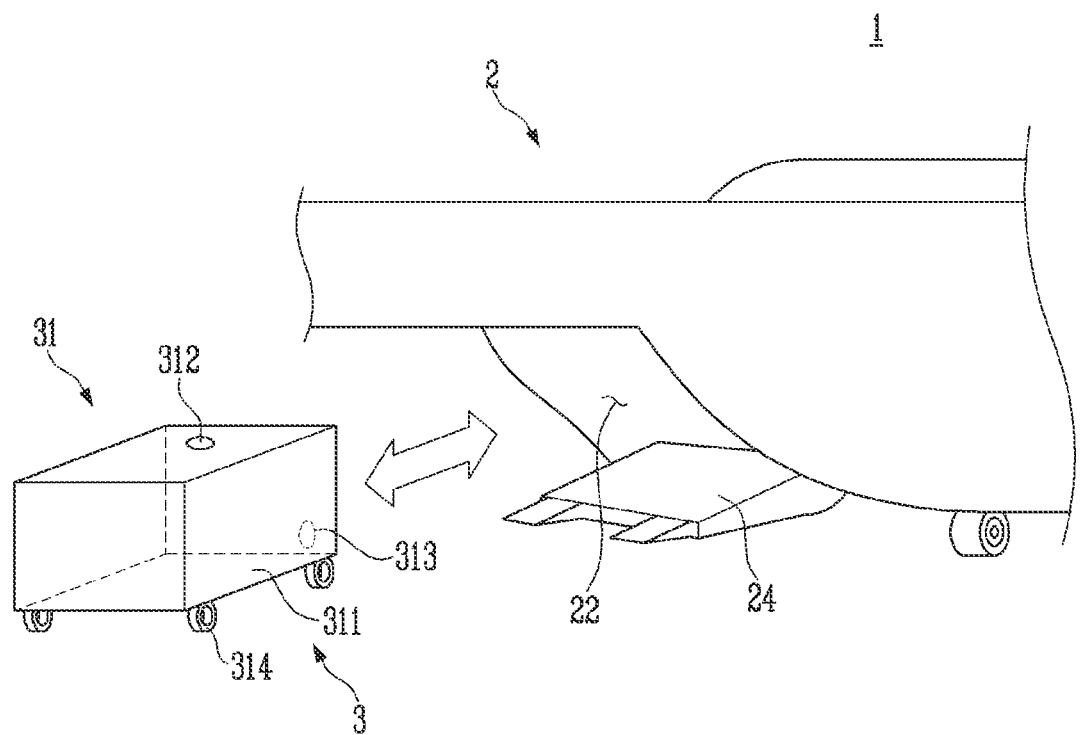
FIG. 1 illustrates a schematic diagram of a fire suppression system and a firefighting aircraft having the same in accordance with an embodiment of the present disclosure.

The objects, specific advantages, and novel features of the present disclosure will become more apparent from the following detailed description and preferred embodiments taken in conjunction with the accompanying drawings. In adding reference numbers to components of each drawing in the present specification, it should be noted that only the same components are given with the same number as much as possible even if the components are shown in different drawings. In addition, in describing the present disclosure, if it is determined that the detailed description of a related known technology may unnecessarily obscure the gist of the present disclosure, the detailed description thereof will be omitted.

A firefighting aircraft of the present disclosure is manufactured as a helicopter rather than an airplane. This is because in the case of airplanes, it is difficult for firefighters in the firefighting aircraft to concentrate and inject fire extinguishing agents (water) in one place as it is almost impossible for airplanes to stay in one place for an extended period of time. Additionally, it was assumed that rear doors of the helicopter are wide open. Furthermore, a heavy-lift helicopter such as the Chinook is preferred as it is more capable of carrying a greater volume of water in the helicopter. Thus, the helicopter is equipped with a fire extinguishing agent container, that is, a water tank and a high-pressure pump for injecting water, and the helicopter is dispatched to the scene of the wildfire along with firefighters onboard. Then, the firefighters utilize a hose connected to the high-pressure pump and water in the fire extinguishing agent container from the air at the scene of the fire in order to spray water toward the fire through the helicopter's windows or the helicopter's side entrance. This is the basic concept of the firefighting aircraft of the present disclosure.

In order to configure the firefighting aircraft of the present disclosure, four types of equipment or devices are required. Firstly, there are fire extinguishing agent containers (water tanks) and associated extinguishing equipment for firefighting itself, secondly, devices for loading and fixing the fire extinguishing agent containers, thirdly, some warning devices and water shields for stable flight, and fourthly, other more efficient equipment or devices for extinguishing the fire.

In addition, a helicopter window of the firefighting aircraft of the present disclosure refers to any portion of the helicopter through which a firefighter onboard the helicopter may inject water while looking at the outside of the helicopter, whether it is a helicopter window or a helicopter side entrance. In the firefighting aircraft of the present disclosure, its position is considered to be on a right side behind the pilot (even in the case of a helicopter entrance, if the helicopter entrance door includes two portions (upper and lower portions) with the lower portion of the door being closed, the upper portion of the door may be open to serve as a window).

Hereinafter, preferred embodiments of the present disclosure will be described in detail with reference to the accompanying drawings.

Figure 2:
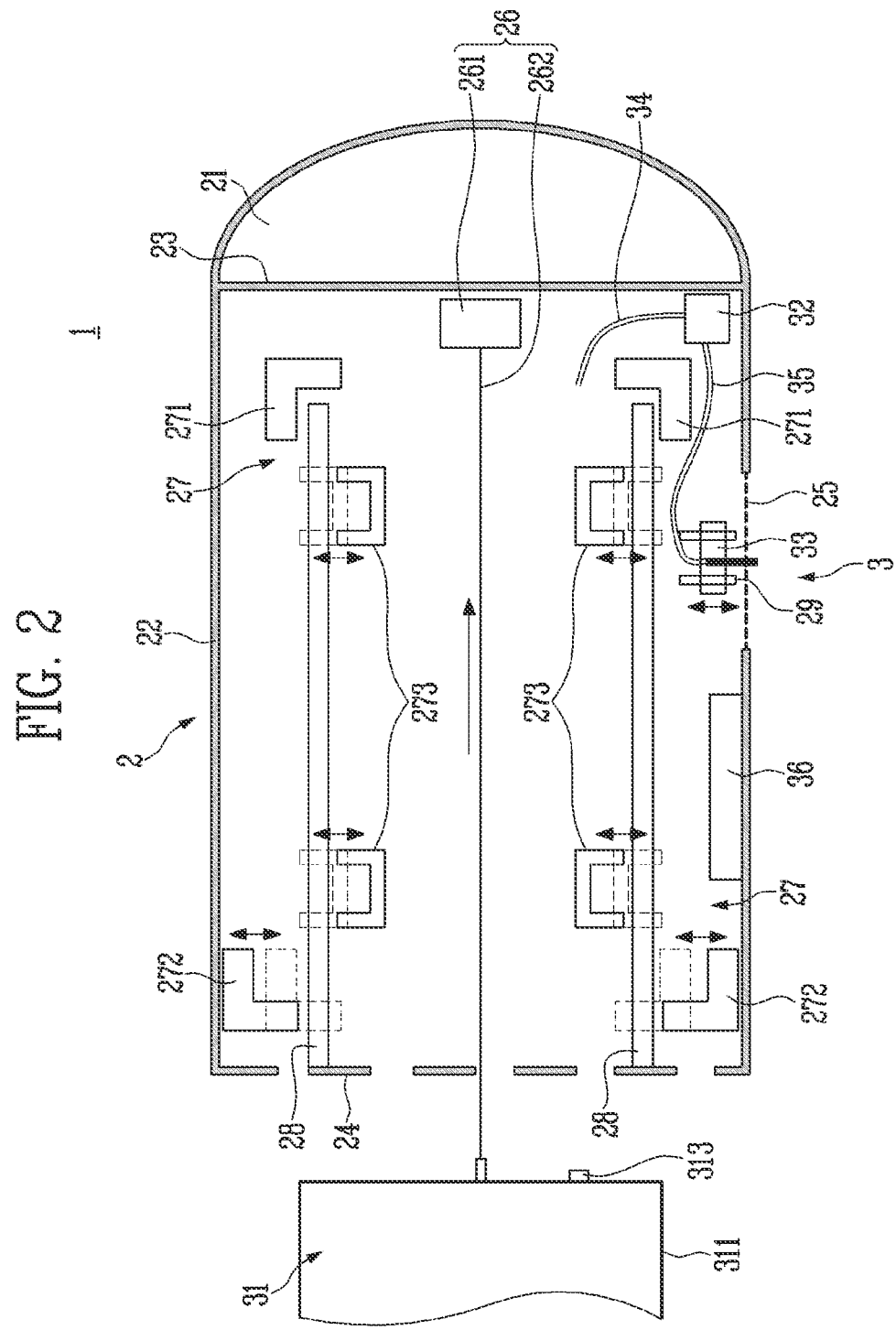
FIG. 2 illustrates a plan sectional view of a fire suppression system and a firefighting aircraft having the same in accordance with an embodiment of the present disclosure.
Figure 3:
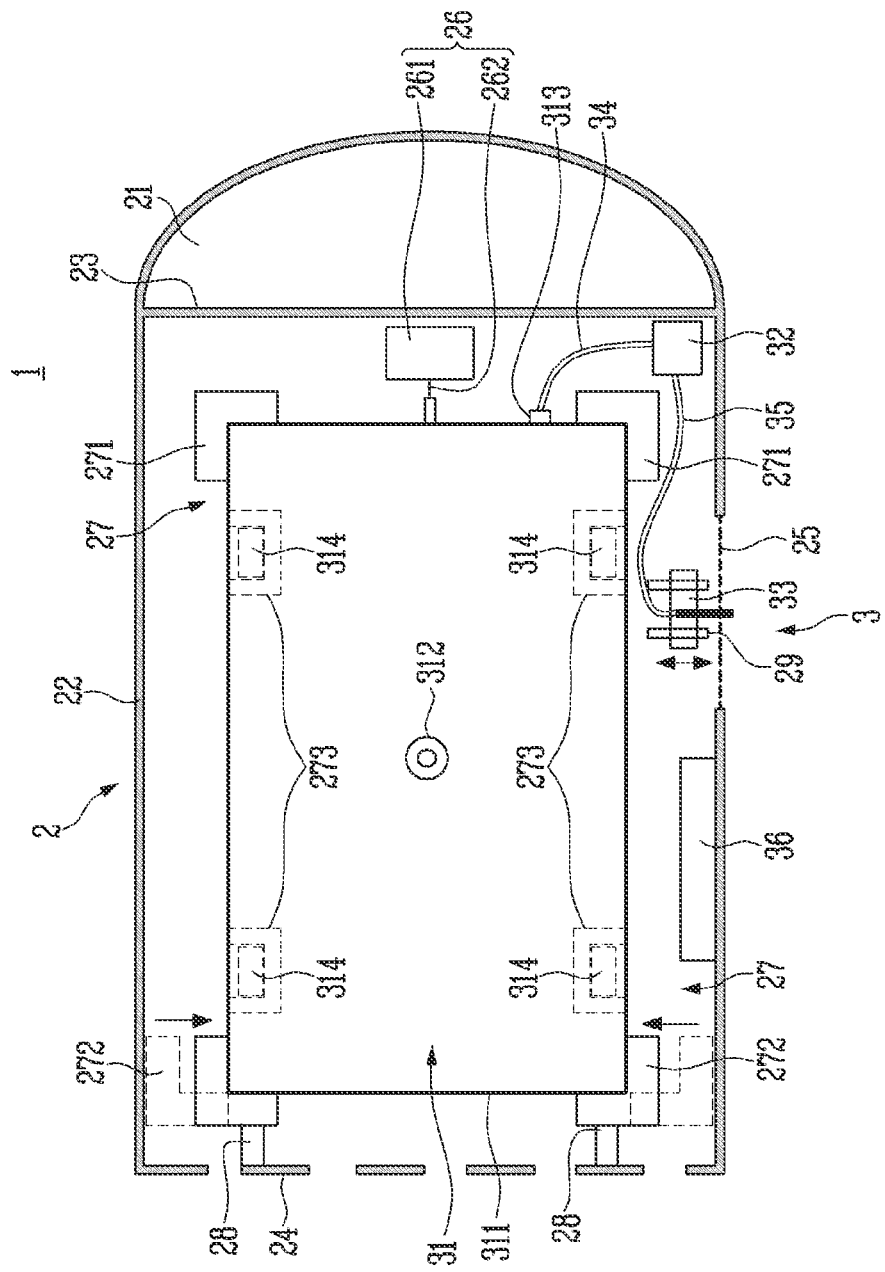
FIG. 3 illustrates a plan sectional view of the firefighting aircraft with a fire extinguishing agent container mounted on the aircraft in FIG. 2.
Figure 4:
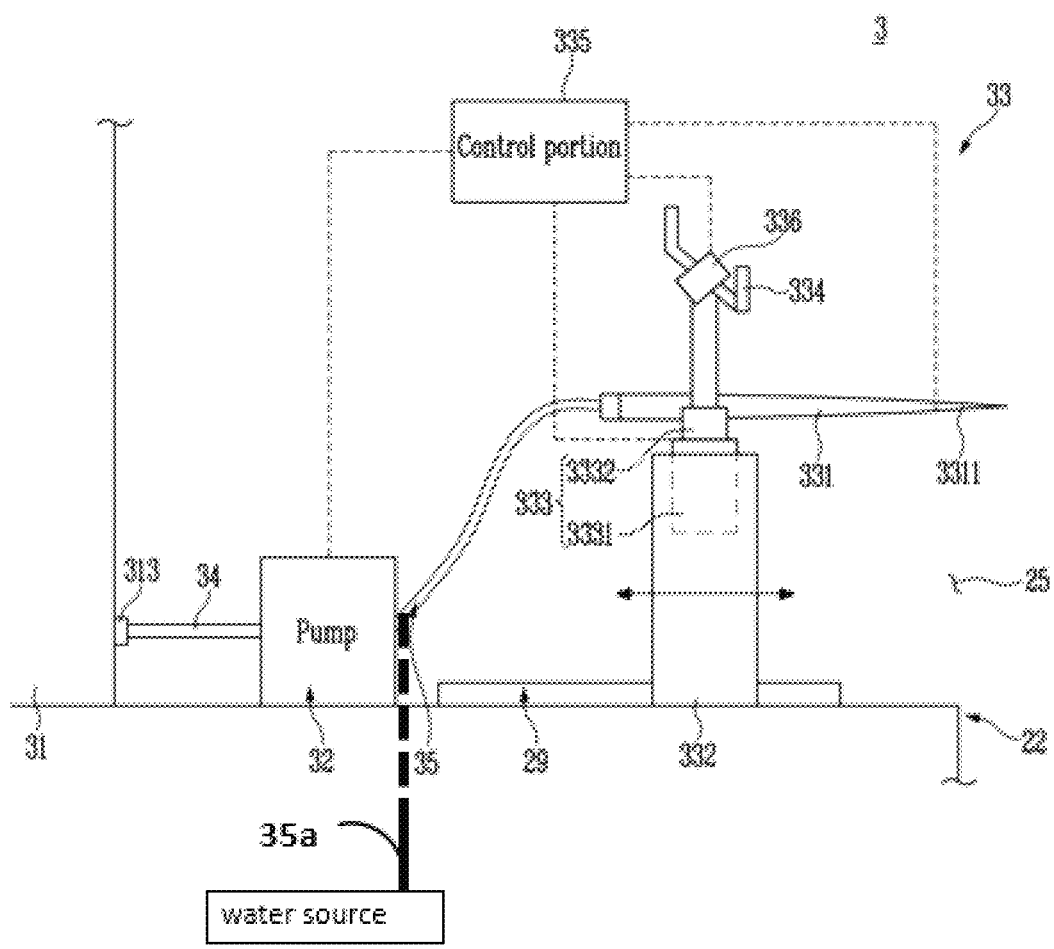
FIG. 4 illustrates a configuration diagram for showing a fire suppression system of the present disclosure.
Figure 5:
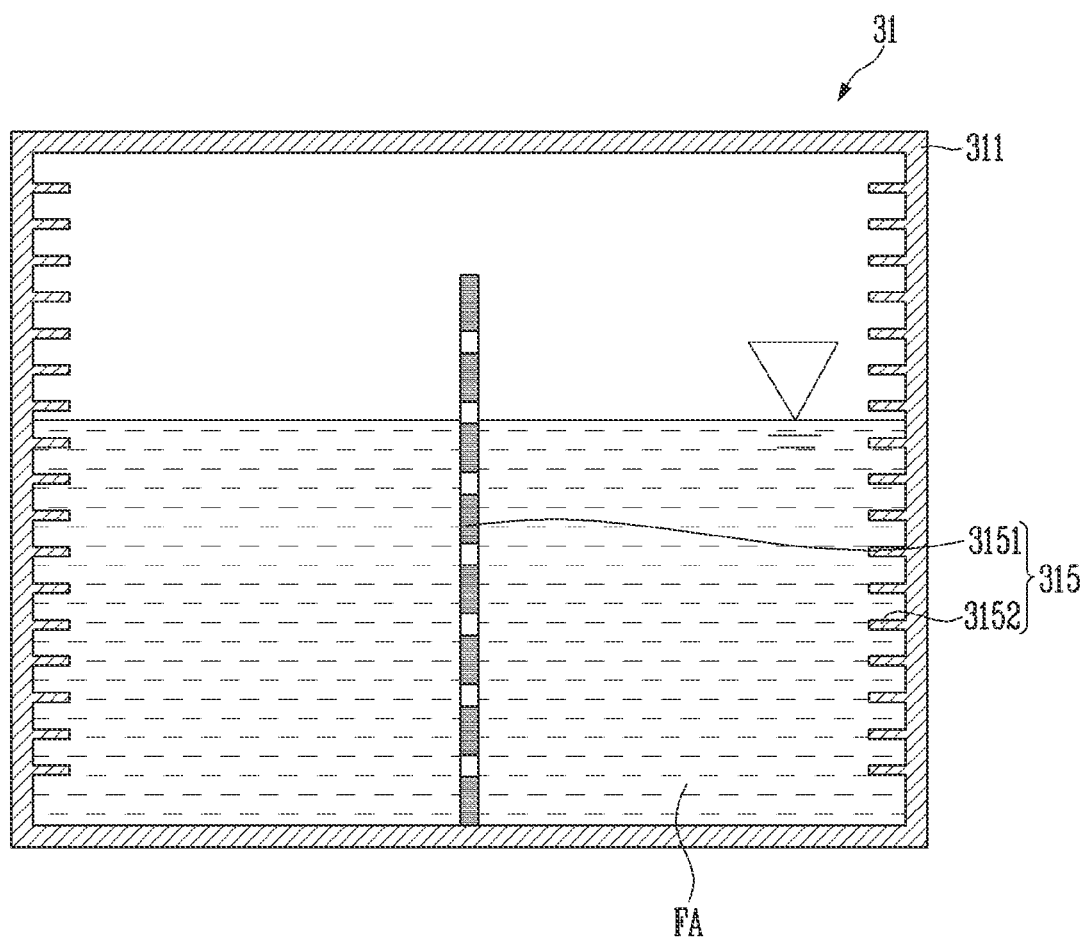
FIG. 5 illustrates a side sectional view for showing an embodiment of a sloshing suppression device installed inside a fire extinguishing agent container in the fire suppression system of the present disclosure.
Figure 6:
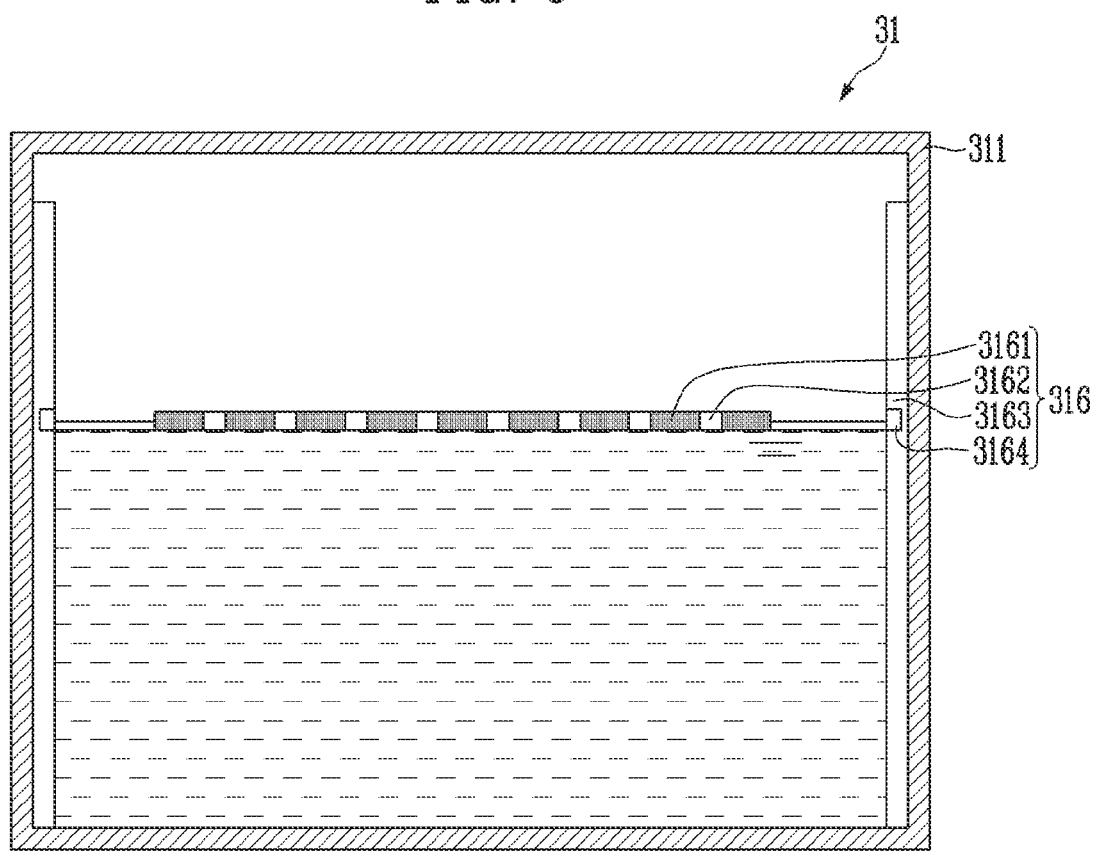
FIG. 6 illustrates a side sectional view for showing another embodiment of the sloshing suppression device installed inside the fire extinguishing agent container in the fire suppression system of the present disclosure.
Figure 7:
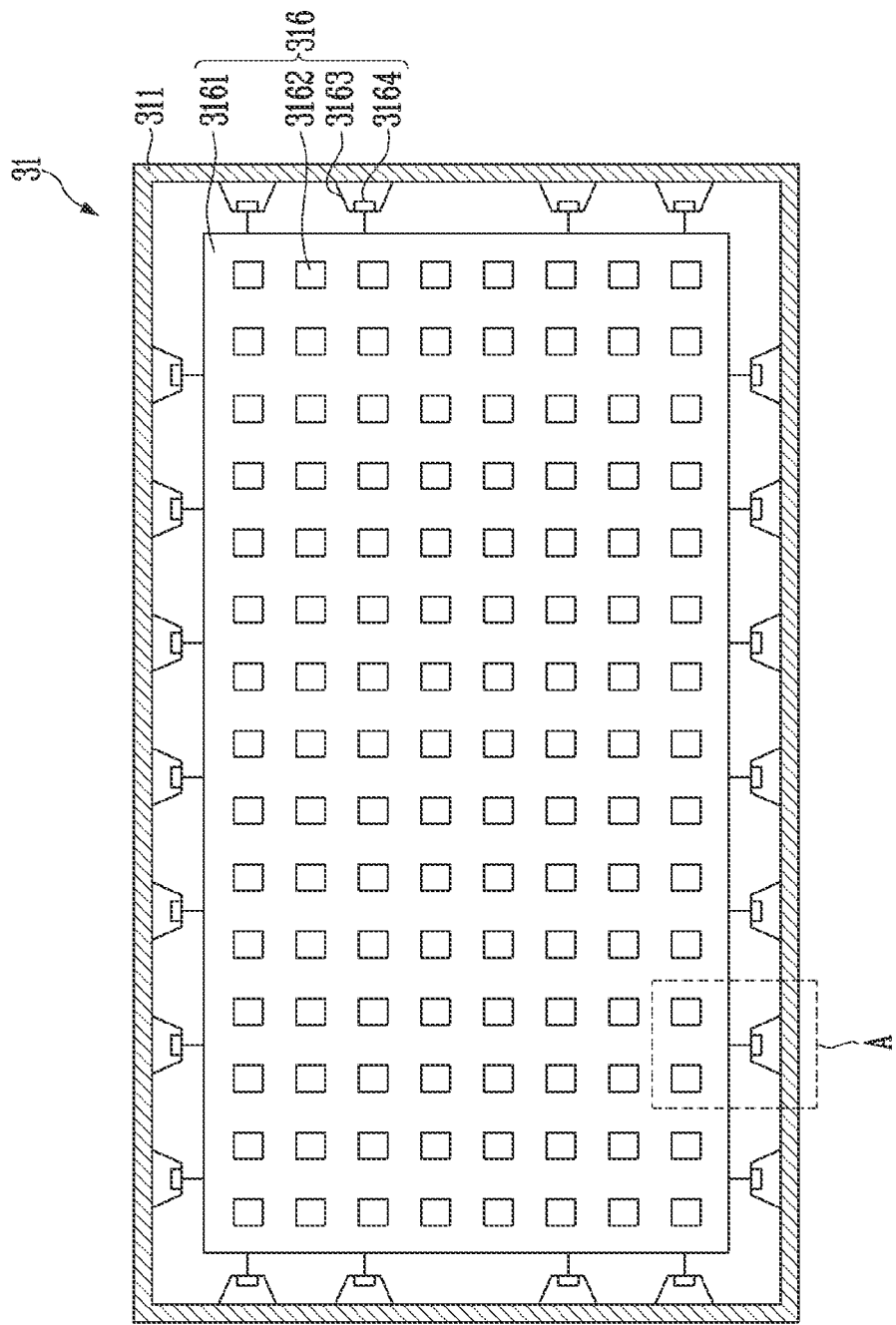
FIG. 7 illustrates a plan sectional view for showing another embodiment of the sloshing suppression device installed inside the fire extinguishing agent container in the fire suppression system of the present disclosure.
Figure 8:
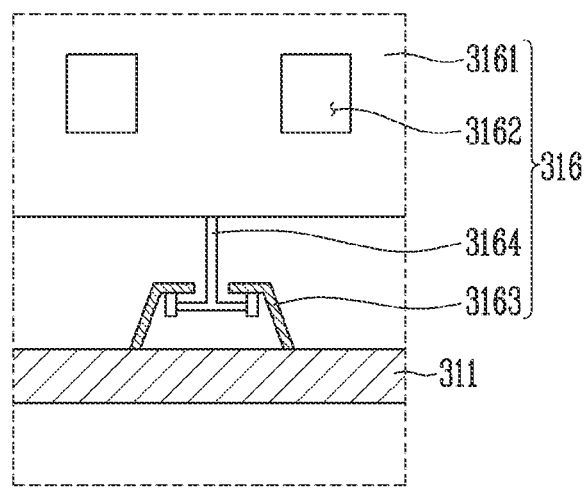
FIG. 8 illustrates an enlarged view of part 'A' of FIG. 7.

FIG. 1 illustrates a schematic diagram of a fire suppression system and a firefighting aircraft having the same in accordance with an embodiment of the present disclosure, FIG. 2 illustrates a plan sectional view of a fire suppression system and a firefighting aircraft having the same in accordance with an embodiment of the present disclosure, FIG. 3 illustrates a plan sectional view of the firefighting aircraft with a fire extinguishing agent container mounted on the aircraft in FIG. 2, FIG. 4 illustrates a configuration diagram for showing a fire suppression system of the present disclosure, FIG. 5 illustrates a side sectional view for showing an embodiment of a sloshing suppression device installed inside a fire extinguishing agent container in the fire suppression system of the present disclosure, FIG. 6 illustrates a side sectional view for showing another embodiment of the sloshing suppression device installed inside the fire extinguishing agent container in the fire suppression system of the present disclosure, FIG. 7 illustrates a plan sectional view for showing another embodiment of the sloshing suppression device installed inside the fire extinguishing agent container in the fire suppression system of the present disclosure, and FIG. 8 illustrates an enlarged view of portion 'A' of FIG. 7.

Referring to FIGS. 1 to 4, a firefighting aircraft 1 according to an embodiment of the present disclosure may include an aircraft 2 and a fire suppression system 3.

The aircraft 2 may include a cockpit 21, a cargo hold 22, a bulkhead 23, a loading ramp 24, and an entrance 25.

The cargo hold 22 may be separated by the cockpit 21 and the bulkhead 23, and may provide a space for mounting a fire extinguishing agent container 31.

The loading ramp 24 may be provided at the rear of the cargo hold 22 for loading or unloading the fire extinguishing agent container 31 from the ground.

The entrance 25 may be provided on a side surface of the cargo hold 22, and a launch device 33 of the fire suppression system 3 may be located at this entrance 25.

The aircraft 2 may further include a loading device 26 installed on the bulkhead 23 side of the cargo hold 22 in order to load the fire extinguishing agent container 31 onto the cargo hold 22 from the ground.

The loading device 26 may be a winder 261 for pulling the fire extinguishing agent container 31 into the cargo hold 22 by connecting the fire extinguishing agent container 31 with a wire 262. However, the loading device 26 is not limited thereto, and the loading device 26 may include any device capable of loading and unloading the fire extinguishing agent container 31.

In addition, the aircraft 2 may further include a container fixing device 27 provided on the bottom of the cargo hold 22 for fixing the fire extinguishing agent container 31.

The container fixing device 27 may include a front fastening portion 271, a rear fastening portion 272, and a wheel fastening portion 273.

The front fastening portion 271 may be installed to correspond to a front width of the fire extinguishing agent container 31, and may be configured to fix the front side of the fire extinguishing agent container 31.

This front fastening portion 271 may be referred to as a main fastening portion for fixing the fire extinguishing agent container 31, and since it does not interfere when loading the fire extinguishing agent container 31 onto the cargo hold, the front fastening portion 271 may be fixedly installed on the bottom of the cargo hold 22.

As shown in FIGS. 2 and 3, a pair of front fastening portions 271 may be installed to fix both of the front side corners of the fire extinguishing agent container 31. In this embodiment, although the front fastening portions 271 are described as being provided in a pair, the embodiment is not limited thereto, and the front fastening portions 271 may be installed in such a manner as to fix the entire front surface including both of the front side corners.

The rear fastening portion 272 may be installed to correspond to a rear width of the fire extinguishing agent container 31, and may be configured to fix the rear side of the fire extinguishing agent container 31.

This rear fastening portion 272 may interfere when the fire extinguishing agent container 31 is loaded onto the inside of the cargo hold 22 through the loading ramp 24. Thus, the rear fastening portion 272 may be variably mounted to the bottom of the cargo hold 22 to avoid any interference.

In other words, a pair of rear fastening portions 272 may be installed to fix both of the rear corners of the fire extinguishing agent container 31, and as shown in FIG. 2, before the fire extinguishing agent container 31 is loaded onto the cargo hold 22, the rear fastening portions 272 may be positioned to be wider than a width of the fire extinguishing agent container 31. As shown in FIG. 3, when the fire extinguishing agent container 31 is loaded onto the cargo hold 22, the rear fastening portions may be varied so as to fix both of the rear corners of the fire extinguishing agent container 31. The rear fastening portion 272 may be variably reversed when lowering the fire extinguishing agent container 31 from the cargo hold 22 to the ground.

When a plurality of wheels 314 are provided on a lower surface of the main body 311 of the fire extinguishing agent container 31, the wheel fastening portion 273 may be installed to correspond to the plurality of wheels 314, thereby fixing the plurality of wheels 314.

As these wheel fastening portions 273 may interfere when the fire extinguishing agent container 31 is loaded onto the cargo hold 22 through the loading ramp 24, the wheel fastening portions 273 may be variably installed on the bottom of the cargo hold 22 to avoid any interference.

In other words, a plurality of the wheel fastening portions 273 may be provided to fix the plurality of wheels 314 of the fire extinguishing agent container 31. As shown in FIG. 2, before the fire extinguishing agent container 31 is loaded onto the cargo hold 22, the wheel fastening portions 273 may be located in a portion outside a moving path of the plurality of wheels 314, and as shown in FIG. 3, after the fire extinguishing agent container 31 is loaded on the cargo hold 22, the wheel fastening portions 273 may be installed variably to fix the plurality of wheels 314. The wheel fastening portion 273 may be reversed variably when the fire extinguishing agent container 31 is lowered from the cargo hold 22 to the ground.

When a plurality of wheels 314 are provided on a lower surface of the main body 311 of the fire extinguishing agent container 31, the aircraft 2 may further include a wheel guide portion 28 for guiding the plurality of wheels 314.

The wheel guide portion 28 may be installed to extend from the loading ramp 24 toward the bulkhead 23 so as to guide the plurality of wheels 314 when the fire extinguishing agent container 31 is loaded onto the cargo hold 22.

Such wheel guide portion 28 may vary depending on a type of the wheels 314. For example, when the wheels 314 are of a tire type, the wheel guide portion 28 may be installed in a groove shape, and when the wheels 314 are of a rail type, the wheel guide portion 28 may be installed in a rail shape.

The aircraft 2 may further include a guide rail (29) for guiding the launch device 33 when the launch device 33 of the fire suppression system 3 is of a variable type.

The guide rail 29 may be installed to extend a particular length from the entrance 25 to the inside of the cargo hold 22 such that the position of the launching device 33 may be adjusted by sliding the launching device 33 back and forth, and a stopper (not shown) may be provided to fix the launching device 33 after adjusting the position of the launching device 33.

As described above, the aircraft 2 of the present disclosure may include a cockpit 21, a cargo hold 22, a loading ramp 24, and an entrance 25, and additionally, the aircraft 2 may be configured to further include a loading device 26, a container fixing device 27, a wheel guide portion 28, and a guide rail 29 for the fire suppression system 3 including a movable fire extinguishing agent container 31 which may be mounted onto the cargo hold 22.

In addition, although not shown in the figures, the aircraft 2 of the present disclosure may further include additional components needed for suppressing wildfires such as headlights, an approach warning device, a heat detection warning device, a camera, etc.

Headlights are necessary equipment for nighttime fire extinguishing, and the headlights of this embodiment are not used for nighttime flight navigation in general. As an example, the headlights are located near the launch device 33 so that the firefighters onboard the aircraft 2 may use the headlights during the nighttime fire extinguishing.

An approach warning device is a device configured to generate an alarm when other aircraft approach in the vicinity of the aircraft, and the approach warning device may be installed on either side of the aircraft 2, which is a blind spot.

In general, when a plurality of aircraft collaborate to extinguish a wildfire, especially at night, when pilots are exposed to dangerous situations such as failing to recognize the approach of other aircraft, the approach warning device may be utilized to warn the pilots of such dangers for ensuring flight safety.

The heat detection warning device is a device configured to generate an alarm when the aircraft 2 is too close to the scene of the fire, and the heat detection warning device may be installed in a lower portion of the aircraft 2.

In general, when extinguishing a wildfire, due to geographical characteristics of mountains with different heights and valleys, there may be cases in which the pilots approach the scene of the fire closely and unknowingly. The heat detection warning device may then be utilized to warn the pilots of such dangers for ensuring flight safety.

The camera may be installed in a lower portion of the aircraft 2 for making visible an unexpected fire directly below the aircraft 2, or for extinguishing embers. The camera may be interfaced with a display 336. Here, six buttons (e.g., left/right/up/down arrow buttons and enlarge/reduce buttons) may be provided on the display 336, and a small red cross mark is drawn at the center of the screen of the display to zoom in or zoom out on a selected portion upon pressing the "enlarge" button or the "reduce" button, and the cross mark may be moved using any of the left/right/up/down arrow buttons when enlarging another portion on the display.

Hereinafter, the fire suppression system 3 installed in the aircraft 2 will be described in detail.

The fire suppression system 3 may include a fire extinguishing agent container 31, a pump 32, and a launch device 33, and may be installed on the aircraft 2 in a manner similar to how firefighters extinguish fires on the ground. However, the fire extinguishing agent container 31 may be stored on the ground and may be configured to be mounted onto the aircraft 2 during wildfire extinguishing.

The fire extinguishing agent container 31 is a container for storing fire extinguishing agents FA, and is usually stored on the ground, and may be loaded onto the cargo hold 22 of the aircraft 2 when extinguishing a wildfire. In this embodiment, the fire extinguishing agent container 31 is described as being mounted on the cargo hold 22 of the aircraft 2. However, the container may also be fixedly installed in the cargo hold 22. In addition, although the fire extinguishing agent container 31 is shown as a rectangular parallelepiped in this embodiment, the fire extinguishing agent container 31 is not limited to such shape. In other words, the fire extinguishing agent container 31 may not be a rectangular parallelepiped essentially. When the pump 32 is disposed between firefighters and front seats, and the launch device 33 is mounted on the helicopter window between the side entrance of the aircraft 2 and the pump 32, there may remain a space between the firefighters and the rear door of the helicopter. Thus, the fire extinguishing agent container 31 may be expanded in the sense that a small cuboid is added by using this portion such that more fire extinguishing agents FA may be loaded. This may be possible by loading the fire extinguishing agent container 31 from the rear side of the helicopter. However, in this case, the container fixing device 27 should be made more rigidly because the four corners may be subject to different forces. In addition, the fire extinguishing agent container 31 may have an entrance through which a person may enter an upper portion for cleaning and maintaining the container's interior.

Here, the fire extinguishing agent FA may include water and/or a moisture enhancer such as foam and gel, but it is not limited thereto.

The fire extinguishing agent container 31 may be loaded onto the aircraft 2 from the ground by the loading device 26 provided in the cargo hold 22, and may be detachably mounted on the container fixing device 27 provided in the cargo hold 22. While the fire extinguishing agent container 31 is described to be loaded or unloaded using the loading device 26 in this embodiment, the present disclosure is not limited thereto, and a device such as a forklift may be utilized such that the forklift directly picks up the container and push the container into the rear door.

The fire extinguishing agent container 31 may include a main body 311, an inlet 312, an outlet 313, and wheels 314.

The main body 311 may store the fire extinguishing agent FA, and may be manufactured in a shape suitable for the cargo hold 22. In this embodiment, although the main body 311 is described as a hexahedron, the main body 311 is not limited to such shape, and may be manufactured in various shapes so as to maximize a loading capacity for the fire extinguishing agent FA.

The inlet 312 may be provided on a portion of the main body 311, for example, on an upper surface of the main body 311 so that the fire extinguishing agent FA may be stored inside the main body 311 from the outside.

The outlet 313 may be provided on a portion of the main body, for example, on a rear side of the main body so that the fire extinguishing agent stored in the main body 311 may be supplied to the launch device 33, and connected to the pump 32, which is coupled to the first fire hose 34. An opening/closing device such as a faucet may be installed at the outlet 313, which enables opening/closing when connected to or disconnected from a fire hose.

A plurality of wheels 314 may be provided on a lower surface of the main body 311, and the fire extinguishing agent container 31 may be loaded onto the cargo hold 22 of the aircraft 2 from the ground, or may be unloaded from the cargo hold 22 to the ground.

The fire extinguishing agent container 31 configured as described above may be loaded from the ground onto the cargo hold 22 or unloaded from the cargo hold 22 to the ground by the loading device 26 provided in the aircraft 2. During the process of loading or unloading, a plurality of wheels 314 may be guided by a wheel guide portion 28 installed to extend from the loading ramp 24 of the aircraft 2 toward the bulkhead 23.

In addition, in order to prevent shaking while flying with the aircraft 2 or during wildfire extinguishing, the fire extinguishing agent container 31 may be fixed to the bottom of the cargo hold 22 by the container fixing device 27 including fastening portions such as the front fastening portion 271, rear fastening portion 272, wheel fastening portion 273, and so forth.

The fire extinguishing agent container 31 may further include sloshing suppression devices 315, 316 installed inside the main body 311 for preventing interference with movement of the aircraft 2 due to sloshing of the fire extinguishing agent FA stored in the main body 31, which will be described with reference to FIGS. 4 to 8.

Firstly, in the fire suppression system 3 of the present disclosure, the sloshing suppression device 315 installed inside the fire extinguishing agent container 31 will be described with reference to FIG. 5.

The sloshing suppression device 315 may include a perforated plate 3151 and baffles 3152.

The perforated plate 3151 may be formed from a plate with a particular height and a plurality of flow holes through which fire extinguishing agents FA may flow in the plate, and at least one plate may be installed at a particular height upward from a lower surface of the main body 311.

The perforated plate 3151 may be configured to prevent a large amount of the fire extinguishing agent FA from being momentarily moved to one side, thereby reducing an impact load applied to side plates of the fire extinguishing agent container 31.

A plurality of baffles 3152 may be installed at a particular height in an inward direction from an inner surface of the main body 311.

The plurality of baffles 3152 may protrude by a preset length toward the inner side of the main body 311, and may be spaced apart from each other at a preset interval in the vertical direction.

Here, each of the plurality of baffles 3152 may be parallel to an upper surface of the fire extinguishing agent container 31, and may be disposed perpendicular to the side surface such that the baffles 3152 may be formed in a flat plate shape having a preset thickness. However, the plurality of baffles 3152 are not limited thereto, and the cross-sectional shape may have a protrusion shape protruding inwardly from the main body 311 by a preset length, such as a triangle or a trapezoid.

When sloshing of the fire extinguishing agent FA occurs inside the fire extinguishing agent container 31 due to a flight of the aircraft 2, and thereby the fire extinguishing agent FA flowing in the left and right direction or forward and backward direction collides with the side plate of the fire extinguishing agent container 31, an air pocket may be created by these plurality of baffles 3152 between the fire extinguishing agent FA colliding with the side plate. Accordingly, the air pocket may serve as a buffer between the fire extinguishing agent FA and the side plate to reduce the impact pressure applied to the fire extinguishing agent container 31.

The sloshing suppression device 315 may be formed of a combination of the above-described perforated plates 3151 and the baffles 3152, but is not limited thereto, and may also be formed of any one of the perforated plates 3151 and the baffles 3152.

Another sloshing suppression device 316 installed inside the fire extinguishing agent container 31 in the fire suppression system 3 of the present disclosure will be described with reference to FIGS. 6 to 8.

The sloshing suppression device 316 may include a buoyancy plate 3161, flow holes 3162, a guide member 3163, and a sliding member 3164.

The buoyancy plate 3161 may be installed in the form of a plate which may cover an entire upper surface of the fire extinguishing agent FA stored in the fire extinguishing agent container 31, and may include a plurality of flow holes 3162 disposed at a particular interval and penetrating in the vertical direction for allowing the fire extinguishing agent FA to flow into the fire extinguishing agent container 31.

As such, by forming a plurality of flow holes 3162 in the buoyancy plate 3161, not only the fire extinguishing agent FA stored in the fire extinguishing agent container 31 may naturally pass through the flow holes 3162 into the fire extinguishing agent container 31 at the upper portion of the buoyancy plate 3161, but also when sloshing of the fire extinguishing agent FA occurs, the impact pressure applied to the fire extinguishing agent container 31 may be reduced by pressing a water surface of the fire extinguishing agent FA such that sloshing of the fire extinguishing agent FA is suppressed.

The buoyancy plate 3161 may be always positioned on an upper surface (water surface) of the fire extinguishing agent FA by the guide member 3163 and the sliding member 3164 regardless of a level of height of the fire extinguishing agent FA.

A plurality of guide members 3163 may be disposed in the vertical direction on a side surface of the main body 311 of the fire extinguishing agent container 31, and arranged at a particular interval in the longitudinal direction The guide members 3163 may be formed in a groove shape so that the sliding members 3164 are inserted therein to be slidable up and down. The guide members 3163 may have a cross-sectional shape of various forms, such as a rectangle, a polygon, and a T-shape, and may have a formed groove into which an end of the sliding member 3164 may be inserted.

A plurality of sliding members 3164 may be formed to correspond to the guide members 3163, wherein an end of the sliding members 3164 may be connected to each of the plurality of guide members 3163 to be capable of rising and falling in accordance with an upper surface level of the fire extinguishing agent FA, and the other end of the sliding members 3164 may be fixedly connected to an edge of the buoyancy plate 3161.

As described above, the sloshing suppression device 316 may effectively suppress sloshing of fire extinguishing agents FA by always placing the buoyancy plate 3161 on the upper surface (water surface) of the fire extinguishing agents FA by the guide members 3163 and the sliding members 3164 regardless of a level of height of the fire extinguishing agents.

The pump 32 may pump the fire extinguishing agent FA stored in the fire extinguishing agent container 31. The pump 32 may be connected to the fire extinguishing agent container 31 by a first fire hose 34, and may be connected to the launch tube 331 of the launch device 33 by a second fire hose 35.

The pump 32 may be installed in the cargo hold 22 of the aircraft 2, and may be a high-pressure pump for both drainage and water supply. Of course, the pump 32 may be installed as a part of the fire extinguishing agent container 31.

The pump 32 may be configured to operate as a drainage pump when extinguishing fires, and may be pumped to launch the fire extinguishing agents FA from the nozzle 3311 through the first fire hose 34 connected to the outlet 313 of the fire extinguishing agent container 31 and the second fire hose 35 connected to the launch tube 331 of the launch device 33. The second fire hose 35 with a sufficient length is preferred. This is because the launch tube 331 is set at a downward angle close to vertical and when spraying the fire extinguishing agent FA with a strong pressure, this pressure should be taken into account.

In addition, the pump 32 may be configured to operate as a water supply pump to fill the empty fire extinguishing agent container 31 with water (new fire extinguishing agent) from a water source when all the fire extinguishing agents FA stored in the fire extinguishing agent container 31 are exhausted, the fire extinguishing agent container 31 are mounted onto the cargo hold 22, and a water source is located nearby while being remote from the storage of the fire extinguishing agent container 31 with the filled fire extinguishing agents FA.

When the pump 32 is operated as a water supply pump, water from the water source (new fire extinguishing agent) may be pumped into the empty fire extinguishing agent container 31 by separating the first fire hose 34 from the outlet 313 and then connecting the first fire hose 34 to the inlet 312 of the fire extinguishing agent container 31, separating the second fire hose 35 from the launch tube 331 and connecting the second fire hose 35 to a third fire hose 35a, and lowering the third fire hose 35a down to the water source.

During the above process, the third fire hose 35a may be a fire hose with a sufficient length for reaching to the water source from the aircraft 2, and may be provided separately in a storage box 36 in the cargo hold 22. Here, the storage box 36 may not only store the third fire hose 35a, but also store firefighting-related members, tools for maintenance, and so forth, including the first fire hose 34 and the second fire hose 35, and may be installed in a free space of the cargo hold 22.

This third fire hose 35a may have one end connected to the second fire hose 35 and a length extending to a water source on the ground, and at the other end, may have an inlet pipe of a hollow cylindrical body into which water from the water source (new fire extinguishing agent) is introduced into an upper portion of one side of the main body to prevent an inflow of any foreign substances.

As described above, in this embodiment, the pump 32 may be used as a combined drainage and water supply. When the fire extinguishing agents FA of the fire extinguishing agent container 31 mounted on the cargo hold 22 while extinguishing the wildfire become exhausted, a new fire extinguishing agent may be replenished through the use of the third fire hose 35a by moving to a water source closest to the scene of the wildfire without moving to a ground storage having the fire extinguishing agent container 31 for storing fire extinguishing agents.

The fire extinguishing agent container 31 of this embodiment may be kept at a designated storage location on the ground at all times in view of potential areas prone to wildfires. However, if a wildfire occurs remotely from the storage location, the container may be transported to an empty space at the scene of the wildfire by using a vehicle such as a trailer such that the aircraft 2 may replace the fire extinguishing agent container 31 from a short distance.

The launch device 33 may be installed near the entrance 25 of the aircraft 2, and fire extinguishing agents FA pumped from the pump 32 may be launched to extinguish the fire.

The launch device 33 may include a launch tube 331, a support portion 332, a rotating portion 333, a handle portion 334, a controller 335, and a display 336, which will be described with reference to FIG. 4.

The launch tube 331 may be connected to the pump 32 by the second fire hose 35, and may be provided with a nozzle 3311 for spraying or injecting the fire extinguishing agent FA pumped from the pump 32.

The launch tube 331 may be configured to be rotatable at a predetermined angle in a direction of up, down, left, and right by steering of the handle portion 334, and thus the fire extinguishing agent FA may be sprayed or injected at various angles to effectively suppress the fire. The angle of rotation in a direction of up, down, left, and right may be determined to be a particular angle for ensuring safety of the aircraft 2 because the aircraft 2 may be put at a risk by a launching pressure when the nozzle 3311 of the launch tube 331 is headed toward the aircraft 2. In addition, an upward angle of the launch tube 331 may preferably be an upward angle of 30 degrees such that the fire extinguishing agent FA is not launched to propellers of the helicopter while maximizing the launching distance of the fire extinguishing agent FA, and a downward angle of the launch tube 331 may preferably be set close to a downward angle of 90 degrees to extinguish any fire directly below the aircraft 2.

The support portion 332 may be installed in the cargo hold 22, and may be configured to support and fix the launch tube 331 to withstand any water pressure.

The support portion 332 may be installed on the guide rail 29 provided in the cargo hold 22. The support portion 332 may be disposed at an optimal position during fire suppression, and may be slidable back and forth along the guide rail 29 for being securely stored after fire suppression. Of course, the support portion 332 may be fixedly installed on the bottom of the cargo hold 22 in place of being installed on the guide rail 29.

The rotating portion 333 may be installed between the support portion 332 and the launch tube 331, and may be configured to rotate the launch tube 331 up, down, left, and right. The rotating portion 333 may include a rotating gear box 3331 and a rotating member 3332.

The rotating gearbox 3331 may be fixedly installed on an upper portion of the support portion 332.

The rotating gearbox 3331 may be operated such that the rotating member 3332 rotates freely or forcibly according to steering of the handle portion 334, and such operations will be described below.

The rotating member 3332 may be installed between the rotating gearbox 3331 and the launch tube 331.

The rotating member 3332 may be rotatable forward, backward, left, and right according to steering of the handle portion 334 in conjunction with the operation of the rotation gear box 3331.

The handle portion 334 may be installed to surround the launch tube 331, and may be configured to steer a direction of the nozzle 3311 of the launch tube 331 up, down, left, and right. The handle portion 334 may horizontally move the support portion 332 so that the launch tube 331 protrudes further to the outside of the aircraft 2, and may then rotate the nozzle 3311 of the launch tube 331, ensuring a sufficient downward angle of the nozzle 3311 during fire suppression. In addition, the handle portion 334 may be configured to be adjustable in height, and thus, cause the launch tube 331 to rotate downward after moving the handle portion 334 vertically, ensuring a sufficient downward angle of the nozzle 3311 during fire suppression. Additionally, the support portion 332 may be configured to include a fixed portion and a rotating portion, wherein the fixed portion may be installed on the guide rail 229 while the rotating portion may be rotatably installed on an upper end of the fixed portion using an angle adjusting device (not shown). Thus, by horizontally moving the fixed portion such that the launch tube 331 protrudes further to the outside of the aircraft 2, and then rotating the rotating portion to render the downward angle of the launch tube 331 close to vertical, a sufficient downward angle of the launch tube 331 may be provided.

The control portion 335 may be configured to display various function buttons (not shown) and interfaced with the display 336 to indicate a current status. The control portion 335 may also be interfaced with various sensors (not shown) for detecting remaining amounts of the fire extinguishing agents FA stored in the fire extinguishing agent container 31 to control each of the pump 32, the rotating portion 333, and the nozzle 3311 and indicate the remaining amounts of the fire extinguishing agents FA.

In the above description, the display 336 may be a button-type display capable of being pressed on directly instead of a touchscreen-type display. In view of the nature of fire suppression, firefighters in general tend to have water on their hands (i.e., there may be remaining water on their hands during tasks resulting from replacing containers and touching launch tubes), and thus it is desirable to configure the display 336 to have buttons which may be pressed directly rather than a touch screen-type. Given that the display 336 may only have few functions used, it may be desirable to configure the display with buttons dedicated to the control portion 335 for protection against moisture. In order to solve the problem of moisture, a watertight transparent vinyl may be covered on the screen of the display 336.

Although the display 336 is illustrated as being installed on the handle portion 334 in this embodiment, the display 336 is not limited to such location. In other words, the display 336 may be installed anywhere to be readily visible by firefighters and for enabling operations.

The control portion 335 may be configured to control the pump 32 by selecting whether or not to operate the pump 32 (on or off) on the display 336.

The control portion 335 may be configured to control the rotating portion 333 by selecting a rotation function (manual or semi-automatic function) for rotating the rotating portion 333 forward, backward, left, and right on the display 336.

In the above embodiment, when the control portion 335 selects the front, rear, left, and right rotation function of the rotating portion 333 as a manual function on the display 336, the control portion 335 may be configured to cause the rotating member 3332 to rotate freely according to steering of the handle portion 334 by controlling the operation of the rotating gear box 331 to be in an off state.

In addition, when the control portion 335 selects the front, rear, left, and right rotation function of the rotating portion 333 as a semi-automatic function on the display 336, the control portion 335 may be configured to cause the rotating member 3332 to be fixed forcibly or to rotate forcibly according to steering of the handle portion 334 by controlling the operation of the rotating gear box 331 to be in an on state.

In addition, the control portion 335 may be configured to control the rotation of the gear box 3331 to be made when steering is detected by the sensor for detecting steering of the handle portion 334, resulting in the rotating member 332 to forcibly rotate in any one of forward, backward, left, and right directions corresponding to the direction of steering of the handle portion 334 such that the nozzle 3311 of the launch tube 331 is moved in any one of up, down, left, and right directions.

Furthermore, when steering is not detected by the sensor for detecting steering of the handle portion 334, the control portion 335 may be configured to cause the launch tube 331 to be fixed while maintaining the direction of the nozzle 3311 as the rotating member 3332 is forcibly fixed without any steering of the handle portion 334 by controlling a gear rotation of the rotating gearbox 3331 to be stopped.

The control portion 335 may be configured to control the nozzle 3311 on the display 336 by selecting a launching method (injection method or spraying method) of the fire extinguishing agents FA injected through the nozzle 3311.

The control portion 335 may be configured to control the nozzle 3311 on the display 336 by selecting a launching pressure (e.g., high pressure, medium pressure, or low pressure) for the fire extinguishing agents FA injected through the nozzle 3311.

The control portion 335 may be configured to display in real time a remaining amount measured by the sensor for detecting the remaining amount of the fire extinguishing agent FA stored in the fire extinguishing agent container 31 on the display 336, and generate an alarm when the measured remaining amount reaches a preset value. Here, the preset value may be a value of the residual amount corresponding to the height of the outlet 313 of the fire extinguishing agent container 31.

While in this embodiment, the fire suppression system 3 is described as being electrically controlled by the control portion 335 as described above, a lot of fire extinguishing agents FA such as water may remain inside the aircraft 2. When the fire suppression system 3 malfunctions due to some collision or electrical errors, electrical components such as the control portion 335 may be removed from the fire suppression system 3, and the fire suppression system 3 may be configured only with mechanical components required for suppressing fires.

As such, the present embodiment may overcome the geographical constraints of the existing fire extinguishing method of the related art. In other words, the firefighting aircraft 1 of the present invention may provide the fire extinguishing agent container 31, which may be mounted and replaced in the aircraft 2 such that the fire extinguishing agent container 31 filled with fire extinguishing agents may be directly loaded and moved to the scene of wildfire extinguishing. Therefore, it is possible to quickly head to the wildfire extinguishing scene together with the fire extinguishing agents at an early stage after an initial report on the wildfire regardless of any water source. This works under the same principle as a fire vehicle on the ground bringing water directly to the scene of a fire upon a report on the fire.

In addition, this embodiment may overcome the inefficiency of the existing fire extinguishing method of the related art. In other words, the firefighting aircraft 1 of the present disclosure may be provided with the fire suppression system 3 inside the aircraft 2 so as to simulate the manner in which firefighters in general extinguish a fire on the ground. Therefore, it is possible for firefighters to effectively extinguish a wildfire by injecting or spraying fire extinguishing agents such as water intensively while looking at the scene of the wildfire by themselves, thereby reducing the amount of any wasted fire extinguishing agents.

In addition, this embodiment may reduce the flight risks of the existing fire extinguishing method of the related art. In other words, in contrast to the method of the related art, the firefighting aircraft 1 of the present disclosure may allow pilots to concentrate only on navigating their aircraft without directly floating water from a water source or spraying water on the fire. In other words, pilots may focus on navigating operations as firefighters onboard the aircraft 2 are in charge of extinguishing fires, thereby reducing flight accidents significantly. Moreover, since the fire extinguishing method itself is far more efficient than the existing method of the related art, not only the amount of wasted water may be reduced, but also the number of flights may be decreased accordingly, and above all, the risk of low altitude flying just above the water surface may also be avoided.

As described above, the firefighting aircraft 1 of this embodiment may overcome the three shortcomings (inefficient fire extinguishing method, geographical constraints, and flight risks) of the existing wildfire extinguishing method of the related art as described above, and thus the firefighting authorities may establish a more organized system of extinguishing wildfires. For example, assume that there is a huge wildfire-prone area. Then, there should be several cities or towns around or within the wildfire-prone area. Assuming that the firefighting aircraft 1 of this embodiment also uses tap water as a fire extinguishing agent similar to a fire vehicle on the ground, such cities or towns where tap water is available may become eligible areas for a fire extinguishing agent (water) supply site. Among these eligible areas, several places are appropriately selected for deploying the firefighting aircraft 1 of this embodiment. In this case, if the area to be covered is unavoidably wide for deployment, multiple firefighting aircrafts of this embodiment are deployed correspondingly to satisfy the need, and if the area to be covered is relatively small, a smaller number of firefighting aircrafts are deployed correspondingly. Of course, in this selected area, a landing site for the firefighting aircraft 1 of this embodiment is provided, and also provided is a pump facility for filling an empty fire extinguishing agent container 31, that is, a large faucet. In order to prepare for a major wildfire, it is desirable to build several of these pump facilities. This is to fill multiple empty fire extinguishing agent containers 31 at the same time. Additionally, it is desirable to have extra fire extinguishing agent containers 31 available. This is also for the same reason. As such, upon receipt of a wildfire report, the firefighting aircraft 1 of this embodiment of the selected fire extinguishing agent supply site closest to the wildfire scene may embark on extinguishing the wildfire. Furthermore, while extinguishing the fire, other more remote firefighting aircraft 1 of this embodiment may arrive and assist with extinguishing the fire. As such, it is likely to be sufficient to extinguish the fire in view of the speed of the firefighting aircraft 1 of this embodiment. However, for example, if the firefighting aircrafts 1 of this embodiment which arrived initially failed to extinguish the wildfire after taking off for the first time and had to additionally extinguish the fire, these aircrafts may be required to return to the fire extinguishing agent supply site and quickly replace the fire extinguishing agent container 31 filled with the fire extinguishing agent and head back to the wildfire area. Also, at the fire extinguishing agent supply site, empty fire extinguishing agent containers 31 are filled up at the same time using multiple water supply facilities (pump facilities). Thus, if the firefighting aircrafts 1 of this embodiment having arrived at the scene of the wildfire more than once and worked to extinguish the wildfire were not able to completely extinguish the wildfire, these firefighting aircrafts 1 may move to this nearby site and have their extinguishing agent containers 31 replaced. Of course, if there is not enough time for the fire extinguishing agent supply facilities (pump facilities, etc.) of the fire extinguishing agent supply site closest to the scene of the wildfire to fill the empty fire extinguishing agent containers 31 of the returning firefighting aircraft 1 of this embodiment, the same operations may be repeated at the second closest fire extinguishing agent site to the scene of the wildfire. This may be fully realized with wireless communication between pilots and between fire extinguishing agent suppliers.

If there is a sufficient number of firefighting aircrafts 1 in this embodiment and the aforementioned method is used, any wildfire may be extinguished sufficiently at an early stage, provided that winds are not strong enough for the firefighting aircraft 1 to take off. However, even if the wildfire had grown unavoidably larger due to strong winds or any other conditions, the wildfire may still be extinguished far more systematically and efficiently than the existing method of the related art, provided that a sufficient number of extra fire extinguishing agent containers 31 were provided in advance. This is because not only the extinguishing method of the present disclosure is efficient itself, but also facilitates the supply of fire extinguishing agents.

In addition, as the firefighting aircraft 1 of this embodiment may avoid the risk of low altitude flying over the water surface of water sources as opposed to the existing method of the related art, it may not be difficult for the firefighting aircraft 1 to fly at night with proper use of headlights on the firefighting aircraft 1. After all, the source for fire extinguishing agents may be illuminated as in broad daylight, and the fire itself is readily visible at the scene of the wildfire.

Additionally, the firefighting aircraft 1 of this embodiment may also be used for another mission of the firefighting authorities, such as a rescue mission or emergency transportation in remote areas. This is thanks to the fact that the fire extinguishing agent container 31 is detachable.

While the present disclosure has been shown and described with reference to certain exemplary embodiments thereof, these embodiments are merely examples and are not intended to limit the scope of the present disclosure. It will be understood by those skilled in the art that various combinations or modifications and applications may be made therein without departing from the spirit and scope of the example embodiments of the present disclosure. Accordingly, technical features related to any modifications and applications which may be easily derived from the example embodiments of the present disclosure should also be construed as falling within the scope of the present disclosure.

What is claimed is:

1. A fire suppression system, wherein the fire suppression system comprises a pump, a launch device, and a fire extinguishing agent container for storing a fire extinguishing agent, and the fire suppression system permits firefighters to suppress fires from an aircraft through an open section on a side of the aircraft, the fire suppression system comprising:
   the fire extinguishing agent container detachably mounted in a cargo hold of the aircraft;
   the pump located in the cargo hold and connected to the fire extinguishing agent container by a first fire hose and configured to pump the fire extinguishing agent, wherein a mounted height of the pump is lower than a height of a bottom of the fire extinguishing agent container; and
   the launch device used for suppressing the fire by launching the fire extinguishing agent pumped from the pump,
   wherein the launch device comprises:
   a launch tube having a nozzle connected to the pump by a second fire hose, the nozzle configured to inject or spray the fire extinguishing agent pumped from the pump;
   a support portion installed in the cargo hold;
   a rotating connector installed between the support portion and the launch tube for rotating the launch tube up, down, left, and right;
   a handle portion, wherein a first side of the handle portion is installed to surround the launch tube and configured for coordinated movement with the launch tube, and a second side of the handle portion is designed to protrude away from the launch tube, and allows manipulation of the nozzle of the launch tube up, down, left, and right; and
   a controller interfaced with a display for displaying a plurality of function buttons and indicating a current status, wherein the controller is additionally interfaced with a plurality of sensors for detecting steering of the handle portion and a remaining amount of the fire extinguishing agent stored in the fire extinguishing agent container,
   wherein the support portion is installed on a guide rail provided inside the cargo hold where the fire extinguishing agent container is mounted,
   the launch device is slidable back and forth in a fire fighter operable space where the pump is located, in a longitudinal direction along the guide rail inside the cargo hold for positioning the launch tube back and forth through the open section on the side of the aircraft, and
   the support portion is fixed after adjusting a position of the launch device in the longitudinal direction.

2. The system of claim 1, wherein the rotating connector comprises:
   a rotating gear box fixedly installed on an upper portion of the support portion; and
   a rotating member installed between the rotating gearbox and the launch tube, and connected to the first side of the handle portion surrounding the launch tube, the rotating member being rotatable forward, backward, left, and right according to steering of the handle portion.

3. The system of claim 2, wherein the controller is configured to:
   control the pump by selecting whether or not to operate the pump on the display;
   control the rotating connector by selecting a rotation function for rotating the rotating portion forward, backward, left, and right on the display;
   control the nozzle by selecting a launching method for the fire extinguishing agent injected through the nozzle on the display; and
   control the nozzle by selecting a launching pressure for injecting the fire extinguishing agent through the nozzle on the display.

4. The system of claim 3, wherein the controller is configured to:
   control the display to display, in real time, a residual amount measured at the sensor for detecting a residual amount of the fire extinguishing agent stored in the fire extinguishing agent container; and
   generate an alarm when the measured residual amount reaches a preset value.

5. The system of claim 1, wherein the fire extinguishing agent container comprises:
   a main body for storing the fire extinguishing agent;
   an inlet provided on an upper surface of the main body for storing the fire extinguishing agent inside the main body;
   an outlet coupled to the first fire hose and provided on a side surface of the main body for supplying the fire extinguishing agent stored in the main body to the launch device; and
   a plurality of wheels provided on a lower surface of the main body for loading onto the cargo hold of the aircraft on a ground surface.

6. The system of claim 5, wherein the fire extinguishing agent container is loaded onto the aircraft from the ground surface, and
   detachably mounted to a container fastener provided in the cargo hold.

7. The system of claim 5, wherein the fire extinguishing agent container further comprises:
   a structural member installed inside the main body storing the fire extinguishing agent and contacting the fire extinguishing agent for preventing interference with movement of the aircraft due to sloshing of the fire extinguishing agent stored in the main body.

8. The system of claim 5, wherein the fire extinguishing agent container further comprises:
   any one of at least a perforated plate installed at a predetermined height upward from a lower surface of the main body and a plurality of baffles installed at a predetermined height inward from an inner surface of the main body, or is formed from a combination thereof.

9. The system of claim 5, wherein the fire extinguishing agent container further comprises:
   a buoyancy plate covering an upper surface of the fire extinguishing agent, and having a plurality of flow holes;
   a plurality of guide members installed in a vertical direction on a side surface of the main body and arranged at a predetermined interval in a horizontal direction; and
   a plurality of sliding members having a first end connected to each of the plurality of guide members to be capable of rising and falling according to an upper surface level of the fire extinguishing agent, and a second end fixedly connected to an edge of the buoyancy plate.

10. The system of claim 5, wherein the pump is a combined water supply and drainage pump installed in the fire extinguishing container or in a part of the cargo hold of the aircraft, and
when extinguishing a fire, the pump is configured to operate as a drainage pump, and to cause the fire extinguishing agent to be launched from the nozzle through the first fire hose connected to the outlet of the fire extinguishing agent container and the second fire hose connected to the launch tube of the launch device, and
when replenishing a new fire extinguishing agent during flight with the fire extinguishing agent container mounted in the cargo hold, the pump is configured to operate as a water supply pump, and to separate the first fire hose from the outlet and connect the first fire hose to the inlet of the fire extinguishing agent container and separate the second fire hose from the launch tube and connect the second fire hose to a third fire hose to replenish the new fire extinguishing agent.

11. The system of claim 10, wherein the third fire hose comprises one end connected to the second fire hose so as to have a length extending to a water source on a ground surface, and at the other end, an inlet pipe into which a new fire extinguishing agent is introduced at an upper end of one side of the main body to prevent an inflow of foreign substances.

12. A firefighting aircraft comprising:
the fire suppression system of claim 1; and
the aircraft on which the fire suppression system is installed,
wherein the aircraft comprises:
a cockpit;
the cargo hold separated by a bulkhead, wherein the fire extinguishing agent container is mounted in the cargo hold;
a loading ramp provided at a rear side of the cargo hold and configured to load or unload the fire extinguishing agent container to and from a ground surface; and
an entrance provided on a side of the cargo hold and at which the launch device is located.

13. The firefighting aircraft of claim 12, further comprising:
a winder installed on the bulkhead side of the cargo hold for loading the fire extinguishing agent container onto the cargo hold from the ground surface,
wherein the winder is configured to connect the fire extinguishing agent container with a wire to pull the fire extinguishing container into the cargo hold.

14. The firefighting aircraft of claim 12, further comprising:
a container fastener provided at a bottom of the cargo hold for fixing the fire extinguishing agent container,
wherein the container fastener comprises:
a front fastening portion installed to correspond to a front width of the fire extinguishing agent container and fixedly installed on the bottom of the cargo hold to fix a front side of the fire extinguishing agent container;
a rear fastening portion installed to correspond to a rear width of the fire extinguishing agent container and variably installed on the bottom of the cargo hold to avoid interference when loading the fire extinguishing agent container onto the cargo hold to fix a rear side of the fire extinguishing agent container; and
a wheel fastening portion installed to correspond to a plurality of wheels provided at a lower surface of a main body of the fire extinguishing agent container, and variably installed on the bottom of the cargo hold to avoid interference when loading the fire extinguishing agent container onto the cargo hold to fix the plurality of wheels.

15. The firefighting aircraft of claim 12, further comprising:
a wheel guide portion extending from the loading ramp toward the bulkhead to guide a plurality of wheels provided on a lower surface of a main body of the fire extinguishing agent container when the fire extinguishing agent container is loaded onto the cargo hold.

16. The firefighting aircraft of claim 12, wherein
the guide rail is installed to extend a predetermined length from the entrance to the inside of the cargo hold to adjust the position of the launch device by sliding the launch device back and forth, wherein the guide rail is fixed to the launch device after adjusting the position of the launch device.

17. The system of claim 1, wherein the pump is located at a bulkhead separating the cockpit and cargo hold.

* * * * *